United States Patent
Waller et al.

(10) Patent No.: US 8,683,602 B2
(45) Date of Patent: Mar. 25, 2014

(54) SYSTEM AND METHOD FOR MULTILEVEL SECURE OBJECT MANAGEMENT

(75) Inventors: Adrian Waller, Reading (GB); Glyn Jones, Reading (GB)

(73) Assignee: Thales Holdings UK PLC, Surrey (GB)

(*) Notice: Subject to any disclaimer, the term of this patent is extended or adjusted under 35 U.S.C. 154(b) by 293 days.

(21) Appl. No.: 12/701,164

(22) Filed: Feb. 5, 2010

(65) Prior Publication Data

US 2011/0040967 A1 Feb. 17, 2011

(30) Foreign Application Priority Data

Feb. 6, 2009 (GB) .................................. 0902029.8

(51) Int. Cl.
*G06F 21/24* (2006.01)

(52) U.S. Cl.
USPC ........ 726/26; 726/1; 726/27; 726/28; 726/29; 726/31; 705/51; 705/52; 705/53; 705/57; 705/59; 380/277; 380/278; 380/279

(58) Field of Classification Search
None
See application file for complete search history.

(56) References Cited

U.S. PATENT DOCUMENTS

| | | | |
|---|---|---|---|
| 6,598,161 B1 | 7/2003 | Kluttz et al. | |
| 2002/0031230 A1 | 3/2002 | Sweet et al. | |
| 2002/0114453 A1* | 8/2002 | Bartholet et al. | 380/44 |
| 2003/0120928 A1 | 6/2003 | Cato et al. | |
| 2003/0161476 A1 | 8/2003 | Fransdonk | |
| 2004/0057579 A1* | 3/2004 | Fahrny | 380/44 |
| 2004/0133785 A1 | 7/2004 | Kugai | |
| 2004/0215661 A1* | 10/2004 | Zhang et al. | 707/104.1 |
| 2005/0039031 A1 | 2/2005 | Mont et al. | |
| 2005/0251865 A1 | 11/2005 | Mont et al. | |
| 2006/0123238 A1 | 6/2006 | Kacker et al. | |
| 2006/0200392 A1 | 9/2006 | Shear et al. | |
| 2006/0210084 A1* | 9/2006 | Fransdonk | 380/278 |
| 2007/0250904 A1 | 10/2007 | Waller | |
| 2007/0256140 A1* | 11/2007 | Venters et al. | 726/26 |
| 2008/0086757 A1* | 4/2008 | Pestoni | 726/2 |

FOREIGN PATENT DOCUMENTS

| | | |
|---|---|---|
| EP | 0 999 488 A2 | 5/2000 |
| EP | 2 015 214 A2 | 1/2009 |
| WO | 02/01271 A1 | 1/2002 |

OTHER PUBLICATIONS

Sorniotti, A. et al., "Efficient Access Control for Wireless Sensor Data", 19th International Symposium on Personal, Indoor and Mobile Radio Communications, Sep. 15-18, 2008, Abstract, IEEE.
Search Report issued Dec. 2, 2010 in GB Application No. 1012190.3.
Search Report issued Apr. 18, 2013 in EP Application No. 10 15 2803.

* cited by examiner (Continued)

Primary Examiner — Jung Kim
Assistant Examiner — Adrian Stoica
(74) Attorney, Agent, or Firm — Baker & Hostetler LLP

(57) ABSTRACT

A system and method for secure transport of data, the method comprising: sharing of key information with a key distributor, wherein the key information is for enabling decryption of first and second encrypted data, the key distributor being for making one or more decryption keys available to an authorized user; creating a container object, the container object comprising: first encrypted data having a first encryption based on at least a part of said key information; second encrypted data having a second encryption based on at least a part of said key information, wherein the first encryption is different to the second encryption; and metadata relating to the first encrypted data and the second encrypted data; and sending the container object to a data store or otherwise making the container object available, to allow user access to said data container object.

37 Claims, 5 Drawing Sheets

SYSTEM AND METHOD FOR MULTILEVEL SECURE OBJECT MANAGEMENT

CROSS-REFERENCE TO RELATED APPLICATIONS

This application claims priority to foreign United Kingdom patent application No. 0902029.8, filed on Feb. 6, 2009, the disclosure of which is hereby incorporated by reference in its entirety.

FIELD OF THE INVENTION

The present invention relates to secure protection of data, for example, in Digital Rights Management (DRM) applications.

BACKGROUND OF THE INVENTION

Secure distribution of digital content from producers to consumers has traditionally been implemented by setting up a secure channel between the producer and the consumer. The most commonly used technologies of this type are SSL (Secure Socket Layer) and IPsec (Internet Protocol Security). However, such technologies suffer from the disadvantage that a significant overhead is required in setting up the secure channel, and this limits its scalability. This overhead is particularly significant when only a small amount of content is to be transferred in a single transaction (a microtransaction), or when the same data is to be sent to a large number of consumers at the same time. Security and privacy issues may arise from the fact that the producer must be directly involved in authorising the consumer.

An alternative approach to secure distribution of digital content is the use of a digital container system. In such a system, protection is applied directly to the content by means of a data encryption process, which removes the need for a secure session. The digital container can be delivered to any number of customers. On receipt by a customer, the data can be decrypted only if the customer has access to the decryption key.

SUMMARY OF THE INVENTION

The present invention is concerned with new systems and methods of using digital containers for protection of data.

A first aspect of the present invention provides a method and corresponding system for secure transport of data, the method comprising: sharing of key information with a key distributor, the key distributor being for making one or more decryption keys available to an authorised user, wherein the key information is for enabling decryption of first and second encrypted data; creating a digital container object, the digital container object comprising: first encrypted data having a first encryption based on at least a part of said key information; second encrypted data having a second encryption based on at least a part of said key information, wherein the second encryption is different to the first encryption; and metadata relating to the first encrypted data and the second encrypted data; and sending the digital container object to, for example, a data store for allowing user access to the digital container object. This method may be performed on a data provider's computer. For example, the data provider may be the originator of the data, or may be an intermediate distributor and packager of the data. The data provider may also perform the encryption of the data. The data distributors may distribute digital containers by any means, for example, via a data store, streamed directly, or via a computer readable medium such as a CD, DVD, memory card, memory stick or portable disk.

The container object may include at least one security attribute of the contained data, such as a classification label, a time of creation, a location of creation, priority marking, etc.

In some embodiments, the key information may be used directly to encrypt or decrypt data, e.g. it may itself be an encryption key. However, in other embodiments, the key information may be processed further, and/or used together with additional data, to generate one or more keys. The key information may be kept secret from other parties, for security of the encrypted data.

In some embodiments, the encryption key is generated using the key information and one or more of security attributes of the data and authorisation policy information defining decryption rights for the data. In some embodiments, the key distributor is an authorisation server, which checks the identity of a user who has requested a key. In other embodiments, a separate authorisation server may be used to verify the identities of users.

The key information may be generated by the data provider, or otherwise obtained by the data provider, and sent from the data provider to the key distributor. This allows both the data provider and the key distributor to use the key information, in some cases together with further information such as one or more authorisation policies, to generate keys for encryption and decryption. In other embodiments, the key information may be generated by the key distributor, or otherwise obtained by the key distributor, and sent from the key distributor to the data provider, to allow the keys to be generated for encryption and decryption of data. In yet other embodiments, the process of generating the key information may be shared between the data owner and the authorisation server, for example, by using cryptographic techniques such as Diffie-Hellman, so that neither has complete control over the key information generation.

Optionally, the container object may include additional data that is not encrypted, and can be viewed by any user without the need for an encryption key. At least one of the first and second encrypted data may itself be a container object comprising a plurality of encrypted data objects. Thus, a set of nested digital containers may be provided, with encryption at one level or at multiple levels.

The container object may also include at least one authorisation policy, where the authorisation policy comprises one or more rules relating to decryption rights of users to decrypt said encrypted data. The rules attached to the encrypted data in the digital container may only be simple rules based on classification labels, in some embodiments. In other embodiments, more sophisticated rules for the release of data may be included. For example, the rules may state what authorisation type or level a user would be required to have in order to be permitted to decrypt the data. They may also or alternatively specify different access levels for particular users, or for users in different network locations, different physical locations, or with certain types of hardware, or other criteria.

Any type of data encryption may be used, for example, in some embodiments the encryption type may include any of AES (Advanced Encryption Standard), DES (Data Encryption Standard), and 3-DES (Triple DES), or any symmetric encryption algorithm. A CBC (Cipher Block Chaining) mode, or any other mode, may be used for encryption. In the embodiments described in further detail, a symmetric type of encryption is used. However, it is alternatively possible to use an asymmetric encryption.

In some embodiments, digital signatures are used, for example, using an algorithm such as DSA (Digital Signature Algorithm) or ECDSA (Elliptic Curve DSA). Alternative algorithms are also possible. However, the use of digital signatures is not essential. The use of digital signatures allows users to check the integrity of digital containers before requesting a key from the key distributor. This is particularly useful in situations where decrypting the digital containers may incur significant cost, e.g. where the encrypted content is charged for.

In embodiments of the invention, any of at least the following options could be used for security protection of containers:
1) Encryption only
2) Encryption plus digital signature, as discussed above.
3) Encryption plus Message Authentication Code (MAC). This provides integrity protection in a more efficient way than digital signatures, but it can't be checked until after the key has been received. This is useful in situations where the integrity protection provided by the encryption alone is not enough, but it is beneficial to avoid the performance overhead of digital signatures and the need to check in advance is not required. In practice, this may be a common situation. Examples of MACs include SHA-1 HMAC and AES CBC-MAC. In this case, two keys may need to be returned, one for the decryption and one to check the MAC.
4) Authenticated encryption mode. These modes are special combined modes of operation for symmetric encryption algorithms that provide encryption and integrity protection at the same time. In this case, only one key is needed. Examples include AES in GCM (Galois Counter Mode).
5) Just integrity protection (e.g. just a MAC) with no encryption. This might be useful in some niche scenarios.

In some embodiments of the invention, a user with a high level of access rights would receive a number of different keys, to allow them to decrypt data at a number of different levels, within their rights. Some of the keys may be the same as the keys for users who have lower access rights, and some of the keys may be provided only to users with at least the same level of security clearance.

In other embodiments, a user with more than a minimum level of access rights may be provided with a single key that is capable of decrypting multiple levels of encryption. For example, the higher the user's access rights, the greater the number of levels of encryption the user's key may decrypt.

An example of a process for using a single key to unlock multiple levels is discussed by Sorniotti, Molva and Gomez in "Efficient Access Control for Wireless Sensor Data", http://www.ieeexplore.ieee.org/xpl/freeabs_all.jsp?isnumber=4699392&arnumber=4699487&count=581&index=94. The basic concept involves the use of a hash tree to construct a hierarchy of keys, which is a fairly well-known technique using one-way hash functions e.g. SHA-1. Knowledge of the key associated with a particular node in the tree enables the derivation of all keys below that node, and hence, gives access to multiple containers. More privileged users are given a key or keys higher in the hierarchy and hence get access to more containers. Because of the one-wayness of the hash function, knowledge of keys associated with a node does not enable the derivation of keys associated with parent, or higher, nodes in the tree.

At least one of the first encrypted data and second encrypted data may use a type of encryption that is dependent on one or more of said authorisation policy and said security attributes. This may prevent any user or third party tampering with the authorisation policy or security attributes. It may result in the decryption failing to operate correctly if the authorisation policy or security attributes have been tampered with. The key information sent to a key distributor may be in a form that can be converted to a valid decryption key by processing the key information using an authorisation policy and security attributes that were originally used during encryption of the corresponding encrypted data. In such embodiments, the use of incorrect authorisation policy or security attributes with the key information to derive a decryption key may result in an incorrect decryption key being generated, which does not correctly decrypt the data, or it may result in an error in the key generation process.

Thus, in some embodiments, the key information may not be the key itself, but data that can be processed to generate the key. In other embodiments, the key information may be the key itself, and this embodiment may be used, for example, when a lower level of key security is required.

The key information may be in a form that will convert to a decryption key if converted using data derived from one or more of the authorisation policy and security attributes, for example, a checksum value or other data that is derived from the authorisation policy and has a smaller data size than the authorisation policy itself.

In some embodiments, keys are generated by the concatenation (or otherwise combining) of information from the digital container header with the key information, which is then input into a hash function (e.g. SHA-1). The output of the hash function may be truncated to the right length for the encryption algorithm. This method provides integrity protection for information in the digital container header, to avoid it being altered by a user in an attempt to increase their access rights. The information from the digital container header that is integrity protected in this way may include any combination of the following: authorisation policies in the header, references to authorisation policies which may not be in the header but may be stored at the authorisation server, security attributes of the data, the content ID of the data to be decrypted, the data owner ID of the data to be decrypted, an ID for the key information that is shared between the data owner and the authorisation server, and possibly other information e.g. application dependent information.

In some embodiments, different hash functions are used with the same key information to provide different key generation algorithms, generating different keys, e.g. for different documents. Completely different key generation algorithms may also be used e.g. key generation algorithms having a common set of properties would be particularly suited.

In addition to, or instead of, the authorisation policies in the digital containers, the data distributor may send one or more general authorisation policies to the key distributor. These general authorisation policies may contain rules that relate to a number of different container objects and/or a number of different users. For example, a general authorisation policy may comprise a rule defining a set of network locations for which no user is authorised to decrypt the data, or a set of network locations for which all users are authorised to decrypt the data, or another criteria that applies to a particular category of users or a particular category of encrypted data, etc.

The first encrypted data may correspond to a first section of a document and the second encrypted data may correspond to a second section of the same document, to allow the document to be distributed to a plurality of users with different authorisation levels for viewing sections of the document, by distribution of the digital container to the plurality of users. Users of a first authorisation level may be authorised to decrypt both the first and second encrypted data, and users of a second authorisation level may be authorised to decrypt the first encrypted data but not the second encrypted data. This same concept can be extended to include more than two different authorisation levels. More than two different sections of the document may each be encrypted and each assigned an authorisation level.

A further aspect of the invention provides a method and corresponding system for managing secure transport of data, the method comprising: sharing of key information with a data distributor, the key information relating to first and second encrypted data for distribution to users from the data distributor; receiving a user request for a key to decrypt at least one of said first and second encrypted data from the data distributor, the user request including one or more of authorisation policy information and security attributes of the data; authenticating the user and determining a level of authorisation assigned to the user; comparing said determined authorisation level assigned to the user with one or more of the authorisation policy information and data security attributes received from the user; if the user has a required level of authorisation, using the key information and one or more of the authorisation policy information and the data security attributes to generate a key, and sending the key to the user. This method may be performed by a server acting as a key distributor and authentication server.

The server may also receive one or more general authorisation policies from the data distributor, and use one or more general authorisation policies in addition to the authorisation policy information received from the user and the key information to generate a key. The server may store security attributes (e.g. clearance levels) for a plurality of users. Users may connect to the authentication server to have their ID verified, their clearance level (or other security attribute) determined, and the key or keys to which they are entitled are then sent to them.

A further aspect of the invention comprises a method and corresponding system for securely obtaining data from a data provider, the method comprising: receiving a container object containing first encrypted data having a first level of encryption, second encrypted data having a second level of encryption, and a header including rules for use of the encrypted content; obtaining a decryption key from a server, to allow decryption of the first encrypted data; and using the decryption key with the container object to decrypt the first encrypted data. This method may be performed by a user's computer. Optionally, sets of containers could be encrypted with the same key, and a key could be returned which would enable the decryption of multiple containers. This could be particularly useful for efficiency reasons where a stream of containers is being received, in order to avoid the situation of having to request a key for every single one received.

A yet further aspect of the invention comprises a method and corresponding system for rendering a document to a user, wherein the document has multiple sections with different security levels, the method comprising requesting authentication of the user at a remote server; receiving one or more decryption keys from the remote server according to an authentication level assigned to the user; decrypting parts of the document for which the decryption key or keys allows decryption, and rendering the document to the user where only the parts for which the user can decrypt, and any parts not requiring decryption, are rendered and any other parts of the document are not rendered.

Another aspect of the invention comprises a data object for secure transport of data, the data object comprising: first encrypted data content, having a first level or type of encryption; and second encrypted data content, having a second level or type of encryption; wherein the first and second levels or types of encryption are different to each other; and a header including rules for use of the content.

In embodiments of the invention, digital containers could contain any kind of data, for example, documents (e.g. text, still pictures, web pages, video, etc) or real-time data (e.g. sensor data, voice, live video, etc). Access control to the data could be based on user authentication (e.g. biometrics, smart card use), user role/identity and entitlements.

Some embodiments of the invention are particularly useful for distribution of documents in which only a part of the document is restricted for viewing, or in which different parts of the document have different levels of authorisation requirement to view them. In the prior art, documents are assigned classifications in their entirety. A document may receive a high classification level simply because one paragraph within it is highly sensitive, whereas the rest of it may be unclassified. In order to release the document to someone with a slightly lower clearance level than the document's classification, it has to be manually examined and sanitised by removing sensitive text. This has to be repeated for all possible end-users, and is a difficult and potentially error-prone task. Such sanitised documents have to be manually transferred between networks and/or workstations at different security levels to make them available to those with lower clearance levels. The need for separate networks and workstations also means that it is difficult for users with lower clearance levels to know of the existence of such potentially useful data.

In some embodiments of the invention, a broker network may be used for the key distribution. A data producer's broker may receive the key information from the data producer, then send it to the data consumer's broker, who may pass it on to the data consumer. This means that the processing may be divided between the brokers in a beneficial way, e.g. the user's brokers may handle all user authentication tasks, and information may be shared between different combinations of brokers, e.g. the user's broker can obtain decryption keys or key information from a number of different sources via a number of different producer's brokers.

In some embodiments, instead of the producer's broker returning individual decryption keys for containers to the consumer's broker, the producer's broker could return the key information (assuming that the consumer's broker could be trusted with it) so that the consumer's broker could generate further keys without referring to the producer's broker. The producer and producer's broker could share multiple sets of key information to make sure that access to only some of its containers can be given in this way. Even in embodiments without a direct exchange of key information amongst brokers, the producer could use multiple sets of key information for this purpose.

In summary, embodiments of the invention may provide at least the following benefits:

Content is stored in digital containers, which protects the content by encryption and, optionally, by integrity protection, while still allowing unclassified (or sanitised) metadata to be visible. This means that all data can be stored on common servers or databases visible to all users, while still preserving the security of the content. Users are therefore aware of all data that exists and that might be useful to them.

Digital container encryption, decryption, key management and authentication can all take place within high assurance hardware crypto boxes situated at user workstations. The architecture can therefore provide high assurance levels for multilevel security.

Authorisation rules for content can be written to any granularity level, allowing much more fine-grained rules to be applied to content than simple classification levels. In addition, scalability can be achieved even for fine granularity of authorisation rules by keeping a common set of domain wide policies at the authorisation broker. In this case, only exceptions, refinements or modifications of these rules would need to be held in the containers.

The distribution architecture scales to multiple domains through the use of a network of authorisation servers.

All users have access to all documents, however, they are only able to see those parts of the documents for which they have sufficient rights or clearance. This removes the need for manual sanitising and manual transferral between workstations and networks. It also solves the problem of a small part of a document being highly sensitive leading to the rest of the document, which could be potentially useful to a wider audience, being kept secret.

The ability to edit a document by cutting and pasting the underlying encrypted data mitigates, to some extent, the risk of saving data with inappropriate classification levels.

BRIEF DESCRIPTION OF THE DRAWINGS

Embodiments of the present invention will now be described, by way of example only, with reference to the accompanying drawings, in which.

DETAILED DESCRIPTION

As discussed above, embodiments of the present invention provide an object based multilevel security architecture. Embodiments of the invention may combine encrypted object distribution, user authentication and the ability to construct and render documents containing multiple secured objects. Documents or container objects may be decrypted or partially decrypted according to the particular rights (e.g. clearance level or other security attribute) of the current user. This allows documents or container objects to contain any granularity of encrypted data as required, and documents to be created containing sections at multiple different security levels. Such documents can be obtained by any user, but only those sections for which the user has clearance will be rendered to them.

Figure 1:
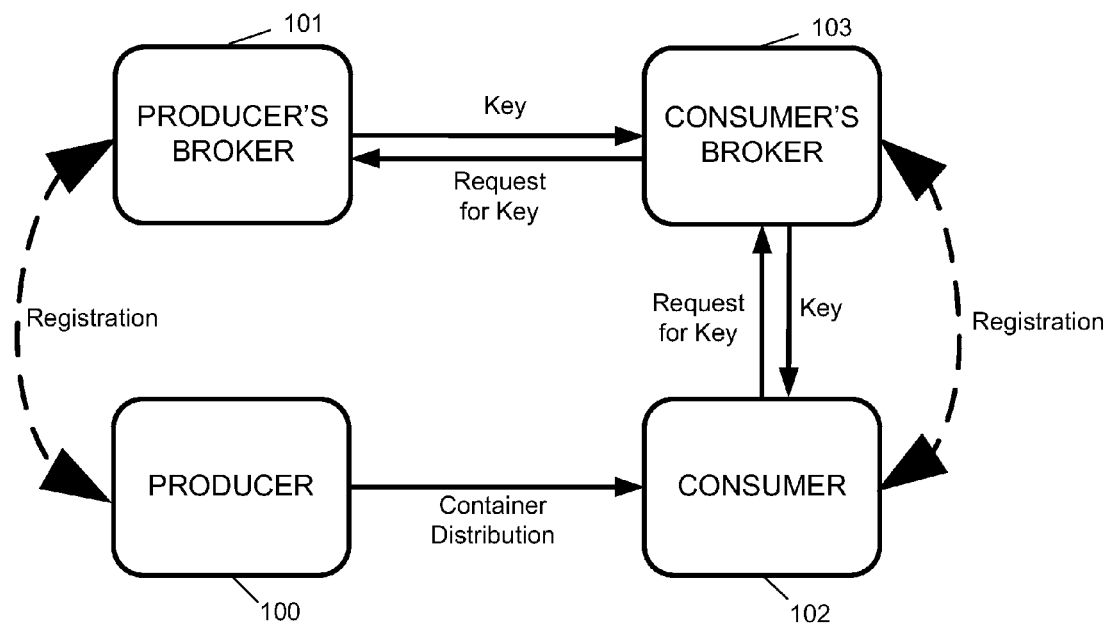
FIG. 1 is a block diagram showing a digital containers transport architecture with a broker network, which may be used in an embodiment of the invention.

FIG. 1 shows an example of a digital container transport architecture, using a broker network to exchange decryption key information for the encrypted data. In this system, a data producer 100 is registered with a broker 101, and uses this broker 101 for distribution of key information. A consumer 102 also registers with a broker 103, which will not, in general be the same as the producer's broker 101. After the registration, the consumer 102 only ever needs to deal with their own broker 103. Keys are obtained from the producers' brokers 101 by the consumer's own broker 103. The encrypted data may be sent to the consumer 102 by any route, and in the example of FIG. 1, it is sent directly from the producer 100 to the consumer 102. This type of system allows simplification of the authentication and authorisation, since the consumer 102 only ever has to deal with a single broker 103. The consumer 102 only has to provide potentially sensitive details to one broker 103, and this can be a broker of their choosing. Consumer anonymity is possible, as consumers provide no details of themselves to producers. The system also allows scalability where users set up one secure connection with a broker which can handle all further key requests In this type of system, protection need only be applied once to data content for end to end transfer, and multiple "hops" do not require multiple encryptions. Pre-preparation of content is thus possible. Any potentially insecure delivery channel may be used for the encrypted data, as the containers provide secure storage. This system is thus ideal for heterogeneous or dynamic networks. The system allows centralised authorisation and access control, so that the producer is freed from handling authentication and authorisation of consumers, and one broker is needed to control all accesses by a user. Centralised decisions and simplified auditing are enabled. Microtransactions are facilitated by this architecture, as it has low overhead for microtransactions. It is content neutral and handles any digital content, e.g. documents, audio, video, etc.

Figure 2:
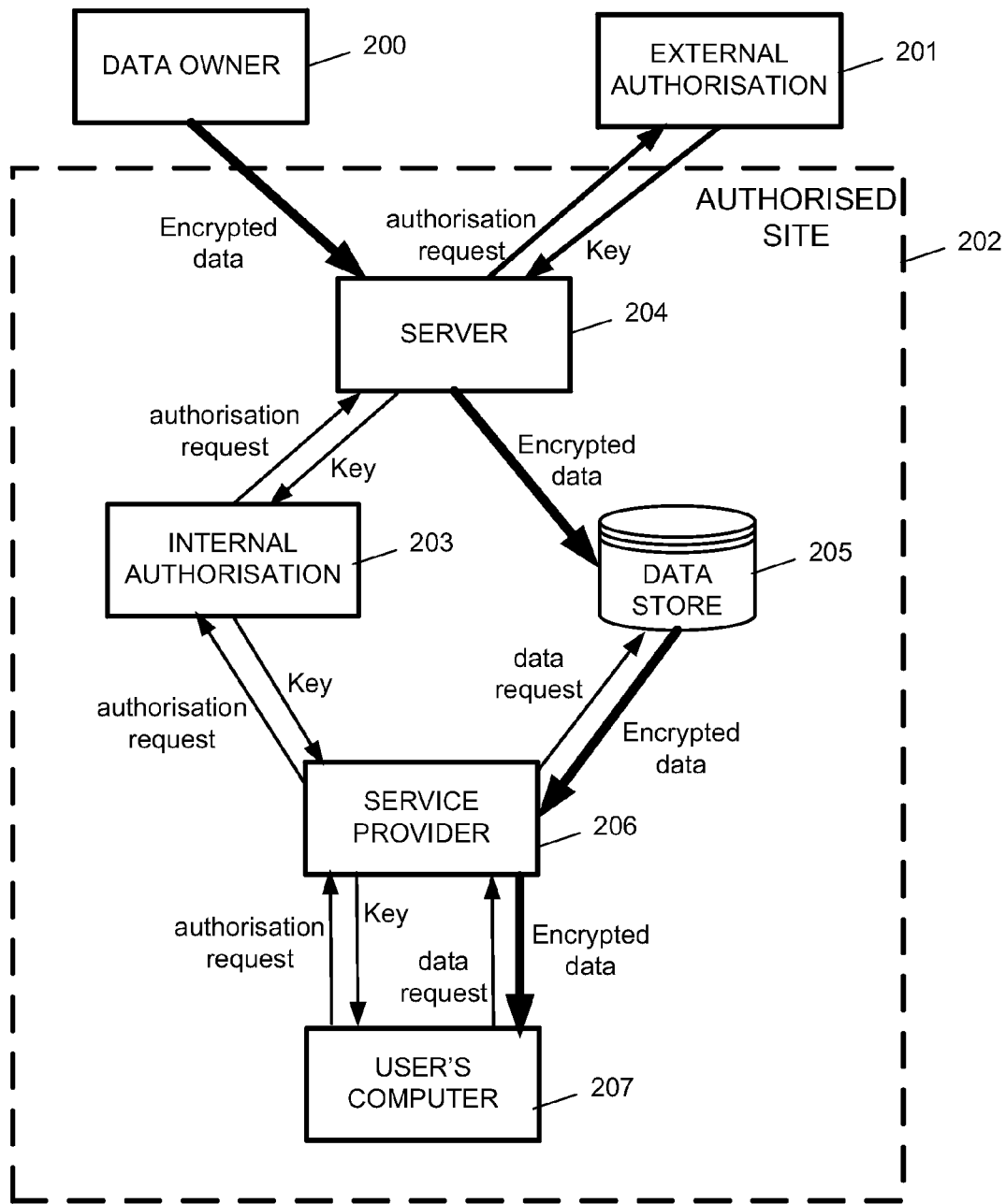
FIG. 2 is a block diagram showing a basic structure of a secure content distribution architecture, which may be used in an embodiment of the invention.

FIG. 2 shows a further example of a secure content distribution architecture. In this architecture, there are three main parties.

The first is the data producer 200, responsible for attaching authorisation policies, such as clearance required, to the data.

The second is the data user 207, who may access data according to their user rights.

The third party is an authorisation server (or servers) 201, 203, 204. These are responsible for checking the rights of the user against the policies that relate, and are attached, to items of data.

Data producers 200 encrypt their data, and then append authorisation policies (rules) relating to the rights required to decrypt the data, security attributes of the data and sanitised metadata describing the contents of the data to form a so-called 'digital container'. An example of a structure of a digital container is shown in FIG. 3.

Figure 3:
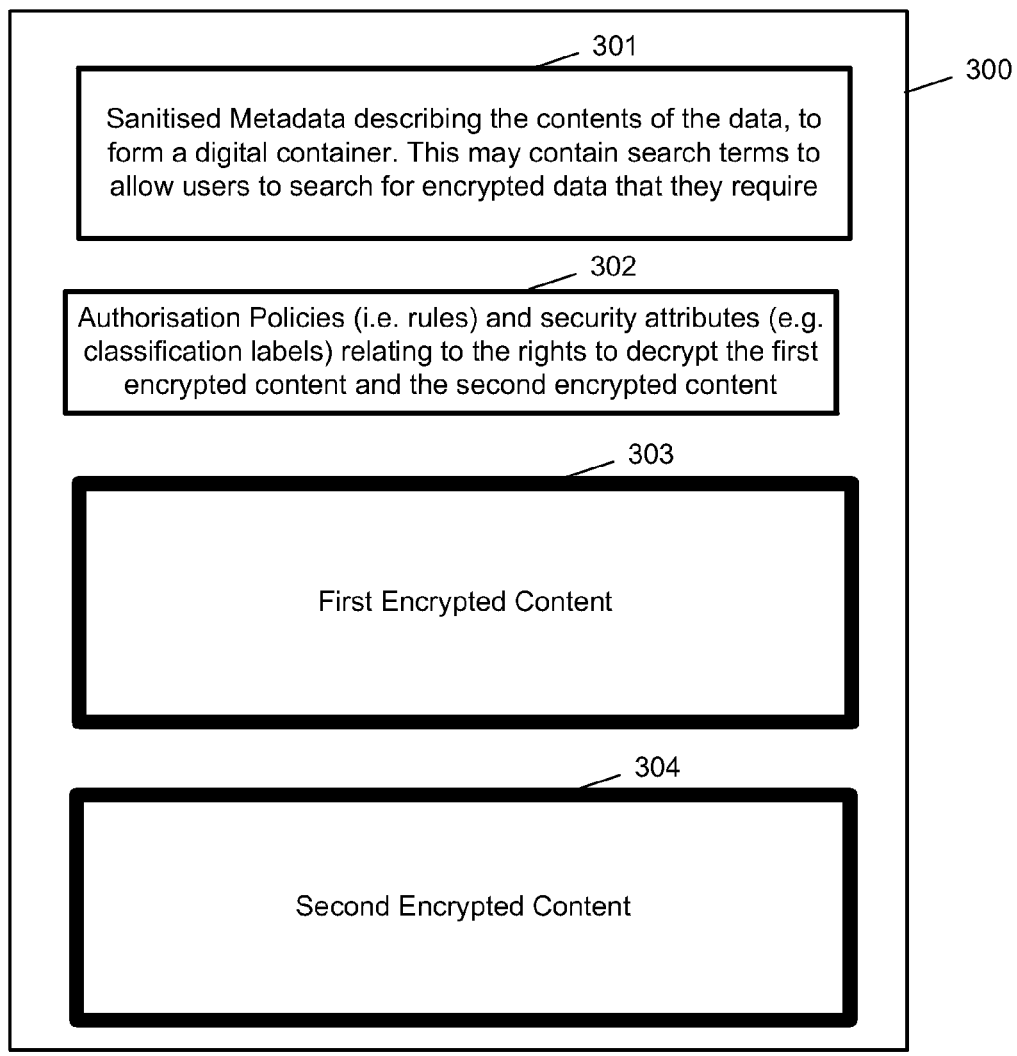
FIG. 3 is a block diagram showing the data structures contained within a digital container in an embodiment of the invention.

The block diagram of a digital container 300 in FIG. 3 shows two encrypted data sections 303, 304. In alternative embodiments, a larger number of encrypted data sections may be included. In some embodiments, all of the data sections are encrypted, but in other embodiments, there may be non-encrypted sections in addition to the encrypted sections. The encrypted sections may each be encrypted in a different way or at a different security level. Alternatively, some of the data sections may be encrypted using the same type and level of encryption. However, at least two different levels or types of encryption are used, for at least two different data sections respectively. FIG. 3 also shows that the digital container 300 includes authorisation policies and security attributes of the data 302, and sanitised metadata 301 describing the contents of the data in the digital container 300.

In some embodiments, the data is encrypted with a key that directly depends on the authorisation policies and security attributes, for example, the key being generated using the authorisation policies and security attributes. This may provide integrity protection for these policies and attributes, as any attempt to modify them will then lead to an incorrect decryption key being generated.

The digital containers can either be sent directly to the computers of data users 207, or, as shown in FIG. 2, stored on servers or databases 205. The heavy arrows in FIG. 2 show the path of the encrypted data as it is transferred within the container objects from the data owner's computer 200 to the server 204, then to the data store 205, to the user's service provider 206, and finally to the user's computer 207. The metadata may allow data users to search for and retrieve information that they require. This can be particularly useful if the digitals containers are stored on servers or databases. As the content is encrypted and the metadata sanitised, digital containers can be stored in common servers or databases, meaning that, in theory, all data users have access to all possible data (subject, of course, to the authorisation policies being satisfied).

FIG. 2 shows that there may be a network of authorisation servers 201, 203, 204. This may be advantageous for scalability reasons and also for security reasons. In these embodiments, an authorisation server may only be responsible for authorising users that it knows about. Users in other domains may be able to get access to encrypted content as long as appropriate trust relationships have been set up between the authorisation servers of the respective domains.

In this example, the network of authorisation servers is arranged as a hierarchy of brokers dealing with the authorisation process. The "External Authorisation" broker 201 is responsible for generating keys and releasing the keys to secure sites. A separate "Internal Authorisation" broker 203 performs fine-grained access control within the site. The communications between the external broker 201 and the internal broker 203, and the communications between the data owner 200 and the data store 205, are regulated by a server 204.

In this embodiment, the actual decryption of content is handled by an assured device located at each user's workstation 207. In this environment, the centralised logging and auditing of access to classified data that this architecture provides would be a significant advantage. In addition, storing of data in encrypted form reduces the risk of exposure and the architecture potentially provides cryptographic separation for multilevel security on the same network.

Once the data user has obtained a particular digital container, they send an authenticated request for the decryption key to the internal authorisation server 203, which is forwarded on to the external authorisation server 201 via the server 204. In some embodiments, this request contains the authorisation policies and security attributes from the digital container, or information derived from the authorisation policies and security attributes. At the external authorisation server 204, once the user is authenticated, the user's rights may be retrieved by the authorisation server from an internal database or by some other technique. In addition, the authorisation rules in the container may be supplemented by a set of common, domain-wide, authorisation rules held at the authorisation server. This provides scalability by reducing the number of rules that need to be transferred with the containers. The retrieved rights are checked against the authorisation policies and data security attributes, and if acceptable, the authorisation server generates the appropriate decryption key. In some embodiments, this key is generated using the authorisation policies and security attributes as an input to the key derivation process. For example, the authorisation policies and security attributes may be used directly to generate the key, or else a checksum or other intermediate may be calculated or derived from the authorisation policies and security attributes, and this checksum or intermediate may be used to generate the key. In some embodiments, only the checksum or intermediate is sent by the user to the authorisation server, instead of the full authorisation policy or security attributes that were included in the digital container, to reduce the amount of data transfer that is necessary.

The key is then sent to the requesting user's computer 207, and the content of the digital container is decrypted. The lighter arrows in FIG. 2 show the path of an authorisation request, from the user's computer 207 via the user's service provider 206 to the internal authorisation server 203. From there, it is forwarded via the server 204 to the external authorisation server 201. The lighter arrows in the opposite direction show the return path of the key to the user's computer, from the external authorisation server 201 via the server 204 to the internal authorisation server 203, and then via the user's service provider 206 to the user's computer 207.

The final part of the process is performed using compliant rendering applications, which in some embodiments are located on the user's computer 207. These rendering applications consist of a content handling part and a rendering part. In order to render a document, applications need to be able to recognise the addition of protected objects to their standard data formats. On detecting such objects, they are passed to the decryption handler. This handler will obtain the decryption key (if possible) and return the decrypted content, or a message saying that decryption was not possible if the user does not have the appropriate rights. This decrypted content will then be substituted for the protected objects by the rendering applications, or suitable placeholder data will be substituted in the case that decryption was not possible. To enable editing, the content handling part of the application needs to allow digital containers to be inserted from other documents, and to be created for new content. By separating content from its presentation, documents are modified and saved in their encrypted form, and this mitigates some of the risk of saving data with inappropriate classification labels.

Implementation may use a combination of XACML (Extensible Access Control Markup Language), which is a declarative access control policy language implemented in XML (Extensible Markup Language), and XMLenc, which is an XML encryption standard, to define the container format. In other embodiments, a different technology may be used, for example, an ASN.1-based (Abstract Syntax Notation One) format.

Some embodiments of the invention extend the XMLenc standard to include the ability to specify XACML authorisation rules with encrypted data. The use of XACML allows generic authorisation policies to be specified. The use of XMLenc, with suitable modifications, allows encrypted XML data elements with associated authorisation rules, written in XACML, to be defined. Documents in this case may be XML documents containing multiple protected data objects. This is similar to the current XMLenc standard, and only requires a small extension to allow the addition of authorisation policies specified in XACML. At the time an XML document is to be rendered, a parser scans the document for protected objects. Any discovered protected objects would be passed to the decryption handling system (e.g. a secure hardware crypto) to obtain the unencrypted contents. Of course, iterated parsing and decryptions may be required if the protected object contains another XML document with other protected objects. After complete decryption, the protected objects are replaced with the decrypted data, or a suitable placeholder (e.g. blank space) if the current user does not have the rights to see that content. Documents may be edited by adding new digital containers, or by copying digital containers from one document to another. The design of the XML standards allows this to take place in a simple way.

User authentication (to the authorisation server) could be achieved using any appropriate mechanism, from passwords for relatively low sensitivity data up to strong authentication techniques such as smart cards and biometrics for more important information. Other authorisation techniques, such as the use of tokens, e.g. with SAML (Security Assertion Markup Language), may also be used.

In the example shown in FIG. 2, a secure hardware device is used to handle the decryption of digital containers and the obtaining of decryption keys from the authorisation server. In this case, the user could strongly authenticate to the hardware device, which would then authenticate on the user's behalf to the authorisation server. By using secure hardware in this way, this architecture can be produced to high assurance levels.

The rules attached to the encrypted data in the digital container may specify a privacy policy of the data originator and/or of the consumer. When a service provider requests the encryption key, the broker can check to make sure that they satisfy this privacy policy before granting access to the data. The broker may also keep a record of this access as a deterrent against misuse.

A digital containers architecture can be used for distributing of and charging for "Infotainment". The content may be audio and video, streamed live events (e.g. a sports match) or even stock market quotes or web pages. Consumers provide payment information to their broker in addition to identification information. Payment between consumers and content providers are cleared using the broker networks. The broker network may allow efficient user account based billing to be used. Consumers hold an account at their broker, and payment for content involves the broker altering the balance for this account, with a corresponding alteration being made at the content provider's broker. This can make even very low payments, e.g. micropayments, feasible without undue overheads.

Figure 4:
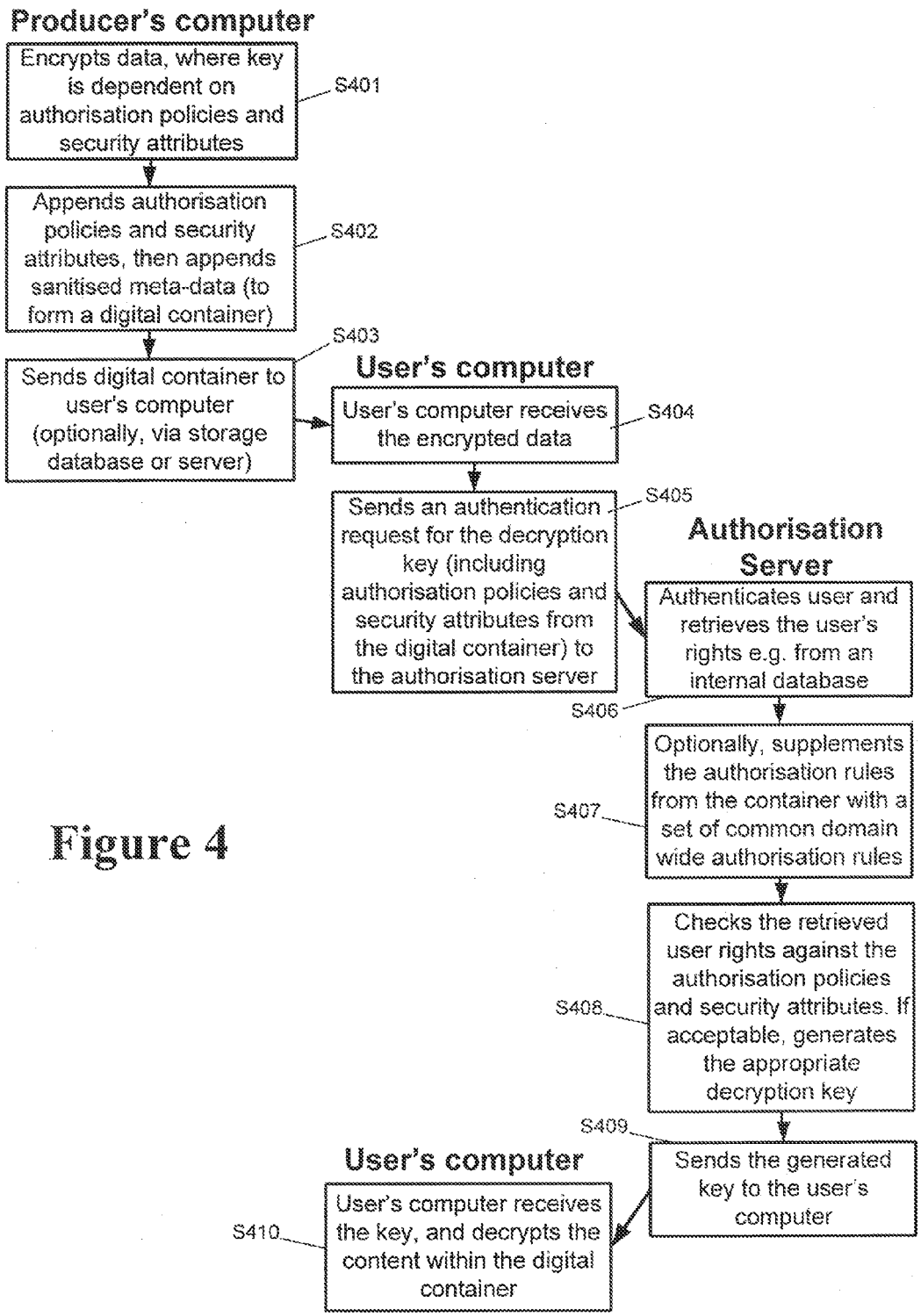
FIG. 4 is a flowchart showing the process of encryption, transport and decryption of data from a data producer's computer to a user's computer, in an embodiment of the invention.

FIG. 4 is a flowchart showing an example process of encryption, transport and decryption, in an embodiment of the invention. The flowchart has three columns of boxes, where the left column corresponds to the data producer's computer, the middle column corresponds to the user's computer, and the right column corresponds to the authorisation server.

The process starts at step S401, where the data producer's computer encrypts data, using a key that is dependent on the authorisation policies and security attributes for that data. Then, at step S402, the data producer's computer appends authorisation policies, security attributes and sanitised metadata to form a digital container. At step S403, the data producer's computer sends the digital container to the user's computer. It may be sent directly, or it may be sent via a storage database or server.

At step S404, the user's computer receives the encrypted data, and at step S405, it sends an authentication request for the decryption key to the authorisation server. The authentication request in this example includes authorisation policies and security attributes from the digital container.

At step S406, the authorisation server receives the request from the user's computer, and authenticates the user. It then retrieves the user's rights, e.g. from an internal database. At step S407, the authentication server supplements the authorisation rules that it received from the user's computer with a set of common authorisation rules for use with a plurality of different users, e.g. all users within the same domain or subdomain, or from the same network location, or with certain other characteristics. In other embodiments, this step is omitted. At step S408, the authorisation server checks the retrieved user rights against the authorisation policies data security attributes. If the check matches up correctly, the authorisation server generates the appropriate decryption key. Then, at step S409, the authorisation server sends the decryption key to the user's computer. At step S410, the user's computer receives the key, and decrypts the content within the digital container. It may then proceed to render all sections of the document that the key is capable of decrypting.

Figure 5:
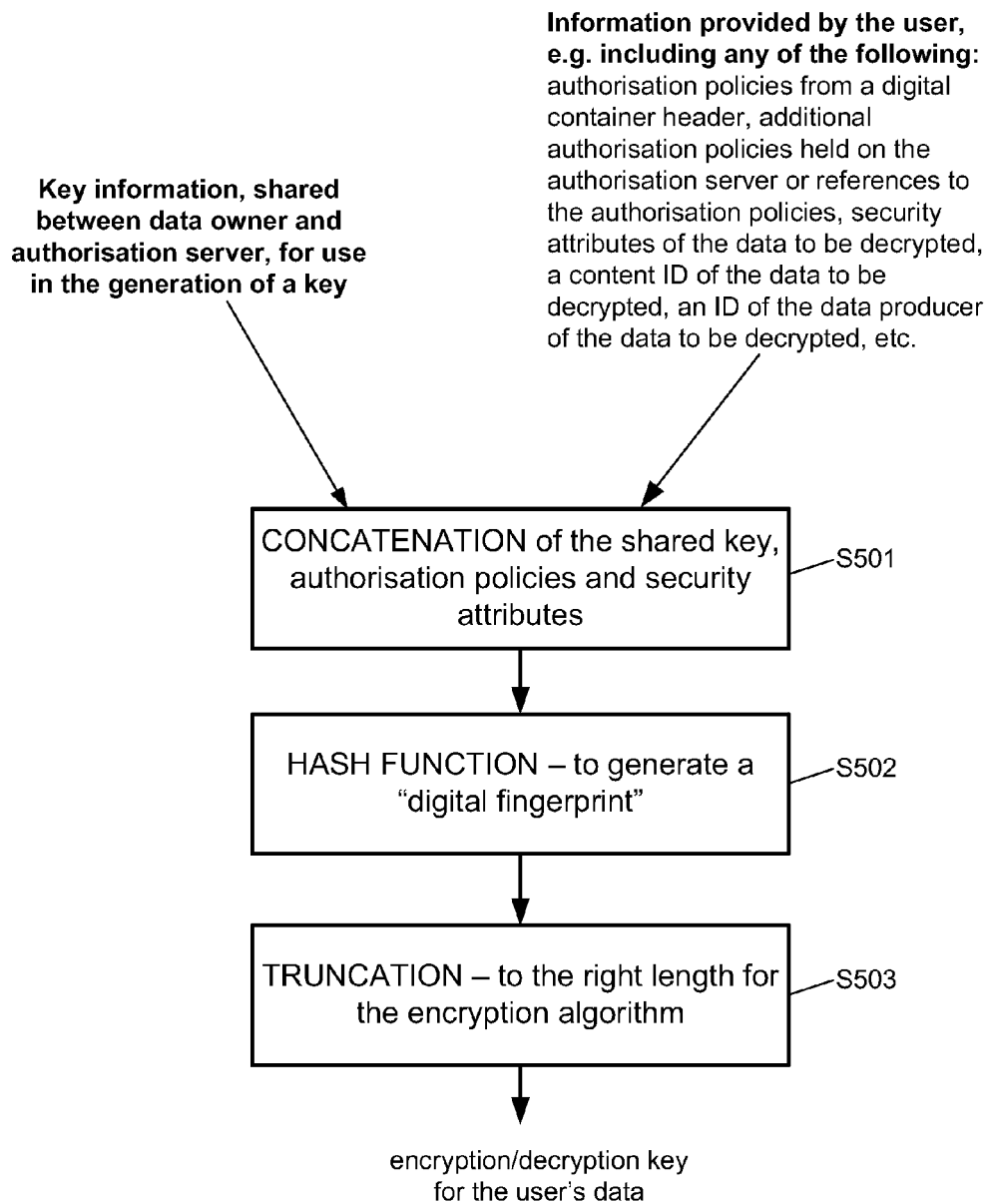
FIG. 5 is a flowchart, showing the process of generating a decryption key at the authorisation server, in an embodiment of the invention.

FIG. 5 shows a more detailed example of how the authorisation server may generate a key to allow decryption of the data by the user. As previously discussed, the authorisation server and the data provider may share some secret key information, which may originate at either the authorisation server, the data provider, a third party, or at a combination of two or more of these. In FIG. 5, this key information is concatenated with information provided by the user to the authorisation server, at step S501. This information provided by the user may include one or more authorisation policies and security attributes. It may also or alternatively include any of the following: references to authorisation policies, content ID relating to the content the user wishes to decrypt, the data owner ID, an ID of the secret key information, and other information which may be application dependent.

The concatenation at step S501 may be replaced by different ways of combining the data, in alternative embodiments. The output of step S501 is then input to generate a hash function at step S502, such as SHA-1, or some other hash function. The hash function provides a "digital fingerprint" of the input data, to give a suitably unique string of data. In some embodiments, an alternative to a hash function can be used to generate unique data for the encryption and decryption algorithms.

At step S503, the output of the hash function is then truncated to the right length for the encryption algorithm. The truncation may be a straightforward discarding of the latter part of the string of data, or it may be more selective, for example, discarding some data at the beginning of the hash function output, or using an algorithm to select parts of the data string according to a particular selection criteria, which may be dependent on the encryption algorithm used.

The present invention can be implemented in dedicated hardware, using a programmable digital controller suitably programmed, or using a combination of hardware and software.

Alternatively, the present invention can be implemented by software or programmable computing apparatus. This includes any computer, including PDAs (personal digital assistants), mobile phones, etc. The code for each process in the methods according to the invention may be modular, or may be arranged in an alternative way to perform the same function. The methods and apparatus according to the invention are applicable to any computer with a network connection.

Thus the present invention encompasses a carrier medium carrying machine readable instructions or computer code for controlling a programmable controller, computer or number of computers as the apparatus of the invention. The carrier medium can comprise any storage medium such as a floppy disk, CD ROM, DVD ROM, hard disk, magnetic tape, or programmable memory device, or a transient medium such as an electrical, optical, microwave, RF, electromagnetic, magnetic or acoustical signal. An example of such a signal is an encoded signal carrying a computer code over a communications network, e.g. a TCP/IP signal carrying computer code over an IP network such as the Internet, an intranet, or a local area network.

While the invention has been described in terms of what are at present its preferred embodiments, it will be apparent to those skilled in the art that various changes can be made to the preferred embodiments without departing from the scope of the invention, which is defined by the claims.

The invention claimed is:

1. A method of secure transport of data, the method comprising:
   sharing of key information between a content provider and a key distributor, wherein the key information is for enabling decryption of first and second encrypted data, the key distributor being configured to make one or more decryption keys available to an authorised user;
   creating, at the content provider, a container object, the container object comprising:
      first encrypted data having a first encryption based on at least a part of said key information;
      second encrypted data having a second encryption based on at least a part of said key information, wherein the second encryption is different from the first encryption; and
      metadata relating to the first encrypted data and the second encrypted data;
      authorisation policy information and/or at least one security attribute comprising one or more rules relating to decryption rights of users to decrypt said encrypted data, wherein at least one of said first encrypted data and said second encrypted data uses a type of encryption that is dependent on said authorisation policy information or security attribute; and
   sending the container object to a data store or otherwise making the container object available, to allow user access to the container object and the authorisation policy information and/or security attribute contained therein,
   wherein the key information shared between the content provider and the key distributor is in a form that can be converted by the key distributor to a valid decryption key by processing the authorisation policy information and/or security attribute, such that the key distributor can generate a valid decryption key upon receipt of the authorisation policy information and/or security attribute from the user.

2. The method of claim 1, wherein the key information is in a form that will convert to an invalid decryption key if an incorrect authorisation policy or security attributes are used with the key information to derive a decryption key.

3. The method of claim 1, wherein the key information is in a form that will convert to a decryption key if processed using a checksum value or other data set that has a smaller size than the authorisation policy and/or security attributes and is derived from the authorisation policy and/or security attributes.

4. The method of claim 1, further comprising sending one or more general authorisation policies to the key distributor, the general authorisation policies relating to a plurality of different container objects.

5. The method of claim 1, further comprising using the key information to encrypt the first data with a first encryption key, and to encrypt the second data with a second encryption key.

6. The method of claim 1, wherein sharing of key information comprises sending the key information to the key distributor.

7. The method of claim 1, wherein sharing of key information comprises receiving the key information from the key distributor.

8. The method of claim 1, wherein sharing of key information comprises generating the key information in co-operation with the key distributor.

9. The method of claim 1, wherein the container object further comprises further data that is not encrypted.

10. The method of claim 1, wherein at least one of said first and second encrypted data is a container object comprising a plurality of encrypted data objects.

11. The method of claim 1, wherein the first encrypted data corresponds to a first section of a document and the second encrypted data corresponds to a second section of the same document, to allow the document to be distributed to a plurality of users with different authorisation levels by distribution of the digital container to said plurality of users, wherein users of a first authorisation level are authorised to decrypt both the first and second encrypted data, and users of a second authorisation level are authorised to decrypt the first encrypted data but not the second encrypted data.

12. The method of claim 1, wherein the container object further comprises a digital signature for allowing a recipient of the container object to check the integrity of the digital container before requesting a key from the key distributor.

13. The method of claim 1, wherein the key distributor comprises a first broker computer in a broker computer network, the key distributor being configured to pass a decryption key or key information to further broker computer in the broker computer network, in order to make the decryption key available to an authorised user.

14. The method of claim 13, wherein the further broker computer receives key information from the first broker computer, allowing the further broker computer to generate further keys without further data transfer from the first broker computer.

15. The method of claim 1, wherein said sharing of key information comprises sharing of multiple sets of key information.

16. A computer system comprising a processor, a data store, and a network interface, configured with computer readable code for performing the method of claim 1.

17. A nontransitory carrier medium carrying computer readable code for controlling a computer to carry out the method of claim 1.

18. A method of managing secure transport of data, the method comprising:
   sharing of key information between a key distributor and a data distributor, the key information relating to first and second encrypted data for distribution in a container object to users from the data distributor, wherein the first encrypted data has a first encryption based on at least part of said key information and the second encrypted data has a second encryption based on at least a part of said key information, the second encryption being different from the first encryption, the container object further comprising authorisation policy information and/or at least one security attribute comprising one or more rules relating to decryption rights of the users to decrypt said encrypted data, wherein at least one of said first encrypted data and said second encrypted data uses a type of encryption that is dependent on said authorisation policy information or security attribute;
   receiving, at the key distributor, a user request for a key to decrypt at least one of said first and second encrypted data from the data distributor, the user request including at least one of the authorisation policy information and security attribute sent in the container;

authenticating, at the key distributor, the user and determining a level of authorisation assigned to the user;

comparing the determined authorisation level assigned to the user with at least one of the authorisation policy information and data security attributes received from the user;

if the user has a required level of authorisation, using the key information and at least one of the authorisation policy information and the security attribute to generate a key, and sending the key to the user.

19. The method of claim 18, further receiving one or more general authorisation policies from the data distributor, and using one or more general authorisation policies in addition to the authorisation policy information and/or data security attributes received from the user and the key information to generate a key.

20. The method of claim 18, wherein generating the key comprises:

generating with a hash function a hash of a combined function of the key information and at least one of authorisation policy information and data security attributes; and selecting at least a part of the resulting hash.

21. The method of claim 18, wherein sharing of key information comprises sending the key information to the key distributor.

22. The method of claim 18, wherein sharing of key information comprises receiving the key information from the key distributor.

23. The method of claim 18, wherein sharing of key information comprises generating the key information in co-operation with the key distributor.

24. The method of claim 18, further comprising storing security attributes for a plurality of users, wherein users connect to the authentication server to have their ID verified, their security attributes determined, and the key or keys to which they are entitled are then sent to them.

25. The method of claim 18, performed by a broker computer in a broker computer network, wherein the data distributor comprises another broker computer in the broker computer network.

26. The method of claim 25, wherein said sharing of key information with the data distributor comprises receiving key information from the data distributor, the method further comprising generating keys from said key information without further data transfer from the first broker computer.

27. The method of claim 25, wherein said sharing of key information comprises sharing one or more of multiple sets of key information.

28. A computer system comprising a processor, a data store, and a network interface, configured with computer readable code for performing the method of claim 18.

29. A nontransitory carrier medium carrying computer readable code for controlling a computer to carry out the method of claim 18.

30. A method of securely obtaining data from a data provider, the method comprising:

receiving, from the data provider, a container object comprising:

first encrypted data having a first encryption based on at least part of key information that is shared between the data provider and a key distributor, second encrypted data having a second encryption based on at least a part of said key information, wherein the second encryption is different from the first encryption, metadata relating to the first encrypted data and the second encrypted data, and at least one authorisation policy and/or at least one security attribute comprising one or more rules relating to decryption rights of users to decrypt said encrypted data. wherein at least one of said first encrypted data and said second encrypted data uses a type of encryption that is dependent on said authorisation policy or security attribute, wherein the key information shared between the data provider and the key distributor is in a form that can be converted by the key distributor to a valid decryption key by processing the authorisation policy and/or security attributes;

requesting a decryption key from the key distributor, the request including sending at least a part of the authorisation policy and/or security attribute received in the container object to the key distributor;

obtaining a decryption key from the key distributor, to allow decryption of the first encrypted data; and using the decryption key with the container object to decrypt the first encrypted data.

31. The method of claim 30, wherein the container object further comprises at least one Message Authentication Code, the method further comprising using said at least one Message Authentication Code to check the integrity of data in the container object, after obtaining said decryption key.

32. The method of claim 30, wherein the container object further comprises a digital signature, the method further comprising checking the integrity of the digital container before requesting a key from the key distributor.

33. A computer system comprising a processor, a data store, and a network interface, configured with computer readable code for performing the method of claim 30.

34. A nontransitory carrier medium carrying computer readable code for controlling a computer to carry out the method of claim 30.

35. A data distributor apparatus for secure transport of data, the apparatus comprising:

a controller for sharing of key information with a key distributor, wherein the key information is for enabling decryption of first and second encrypted data, the key distributor being for making one or more decryption keys available to an authorised user;

at least one processor for creating a container object, the container object comprising:

first encrypted data having a first encryption based on at least a part of said key information;

second encrypted data having a second encryption based on at least a part of said key information, wherein the second encryption is different to the first encryption;

metadata relating to the first encrypted data and the second encrypted data; and at least one authorisation policy and/or at least one security attribute comprising one or more rules relating to decryption rights of users to decrypt said encrypted data, wherein at least one of said first encrypted data and said second encrypted data uses a type of encryption that is dependent on said authorisation policy or security attribute; and a data controller for sending the container object to a data store or otherwise making the container object available, to allow user access to the container object and the authorisation policy and/or security attribute contained therein, wherein the key information shared between the data distributor and the key distributor is in a form that can be converted by the key distributor to a valid decryption key by processing the authorisation policy and/or security attributes such that the key distributor can generate a valid decryption key upon receipt of authorisation policy information and /or security attributes from the user.

36. A key distributor apparatus for distributing keys for secure transport of data, the apparatus comprising:
   a controller for sharing of key information with a data distributor, the key information relating to first and second encrypted data distributed in a container object to users from the data distributor, wherein the first encrypted data has a first encryption based on at least part of said key information and the second encrypted data has a second encryption based on at least a part of said key information, the second encryption being different from the first encryption, the container object further comprising authorisation policy information and/or at least one security attribute comprising one or more rules relating to decryption rights of the users to decrypt said encrypted data, wherein at least one of said first encrypted data and said second encrypted data uses a type of encryption that is dependent on said authorisation policy information or security attribute;
   an interface for receiving a user request for a key to decrypt at least one of said first and second encrypted data from the data distributor, the user request including at least one of the authorisation policy information and security attributes sent in the container;
   at least one processor for authenticating the user and determining a level of authorisation assigned to the user, comparing the determined authorisation level assigned to the user with at least one of the authorisation policy information and data security attributes received from the user, and if the user has a required level of authorisation, using the key information and at least one of the authorisation policy information and security attributes to generate a key to be sent to the user.

37. A user terminal for securely obtaining data from a data provider, the user terminal comprising:
   a network interface for receiving a container object from the data provider, the container object comprising:
   first encrypted data having a first level of encryption based on at least part of key information that is shared between the data provider and a key distributor,
   second encrypted data having a second level of encryption based on at least a part of said key information, wherein the second encryption is different from the first encryption,
   metadata relating to the first encrypted data and the second encrypted data; and
   at least one authorisation policy and/or at least one security attribute comprising one or more rules relating to decryption rights of users to decrypt said encrypted data, wherein at least one of said first encrypted data and said second encrypted data uses a type of encryption that is dependent on said authorisation policy or security attribute;
   a data decryptor configured for requesting a decryption key from the key distributor, the request including sending at least in part the authorisation policy and/or security attribute received in the container object to the key distributor, for obtaining a decryption key from the server, to allow decryption of the first encrypted data; and for using the decryption key with the container object to decrypt the first encrypted data.

* * * * *